(12) United States Patent
Farrell et al.

(10) Patent No.: US 10,972,333 B2
(45) Date of Patent: Apr. 6, 2021

(54) METHOD AND DEVICE FOR REAL-TIME NETWORK EVENT PROCESSING

(71) Applicant: Telefonaktiebolaget LM Ericsson (publ), Stockholm (SE)

(72) Inventors: Paddy Farrell, Athlone (IE); Robin Grindrod, Athlone (IE); Yujie He, Athlone (IE); Mingxue Wang, Athlone (IE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/084,598

(22) PCT Filed: Mar. 16, 2016

(86) PCT No.: PCT/EP2016/055740
§ 371 (c)(1),
(2) Date: Sep. 13, 2018

(87) PCT Pub. No.: WO2017/157438
PCT Pub. Date: Sep. 21, 2017

(65) Prior Publication Data
US 2019/0081851 A1    Mar. 14, 2019

(51) Int. Cl.
*H04L 12/24* (2006.01)
*G06F 9/54* (2006.01)
*H04L 12/26* (2006.01)

(52) U.S. Cl.
CPC ............ *H04L 41/065* (2013.01); *G06F 9/542* (2013.01); *H04L 41/064* (2013.01);
(Continued)

(58) Field of Classification Search
CPC ..... H04L 41/065; H04L 43/16; H04L 41/069; H04L 41/0622; H04L 41/064; G06F 9/542
See application file for complete search history.

(56) References Cited

U.S. PATENT DOCUMENTS 6,356,885 B2    3/2002 Ross et al.
7,389,345 B1    6/2008 Adams
(Continued)

FOREIGN PATENT DOCUMENTS

WO    2012 000540 A1    1/2012

OTHER PUBLICATIONS

Alarm Correlation Engine (ACE) by Peng Wu et al,; GTE Laboratories Incorporated, Waltham, MA—1998.
(Continued)

*Primary Examiner* — Michael Won
(74) *Attorney, Agent, or Firm* — Baker Botts, LLP

(57) ABSTRACT

A method of real-time processing of network events, wherein an event comprises a plurality of attributes. The method comprises maintaining counters, including counters indicating numbers of occurrences and co-occurrences of instances of specific attributes of received network events, maintaining a record of instances of specific attributes of recent events, receiving a first event, increasing respective counters based on the instances of attributes of the first event. The method further comprises calculating relation measure scores between a first instance of the first attribute of the first event and instances of the first attribute of events recently received. The relation measure score depends on a number of co-occurrences in which the first instance of the first attribute and a second instance of the first attribute were received within the measurement window, the total number of occurrences of the first instance and the total number of occurrences of the second instance. The method also comprises identifying a group of events as related based on their relation measure scores and creating incident information based on the identified group of events.

20 Claims, 6 Drawing Sheets

(52) U.S. Cl.
CPC ........ *H04L 41/069* (2013.01); *H04L 41/0622* (2013.01); *H04L 43/16* (2013.01)

(56) References Cited

U.S. PATENT DOCUMENTS

| | | | |
|---|---|---|---|
| 7,631,222 | B2 | 12/2009 | Hasan et al. |
| 9,317,343 | B1* | 4/2016 | Willhoit ............... G06F 16/2228 |
| 10,025,645 | B1* | 7/2018 | Bastian .................... G06F 9/542 |
| 10,110,419 | B2* | 10/2018 | Whitner ............... H04L 41/0631 |
| 2001/0014886 | A1 | 8/2001 | Ross et al. |
| 2005/0038827 | A1* | 2/2005 | Hooks ..................... G06F 21/55 |
| 2005/0076113 | A1* | 4/2005 | Klotz ..................... H04L 43/00 709/224 |
| 2005/0251406 | A1* | 11/2005 | Bolt ....................... H04M 15/47 726/23 |
| 2006/0041659 | A1 | 2/2006 | Hasan et al. |
| 2006/0075093 | A1* | 4/2006 | Frattura .............. H04L 63/1416 709/224 |
| 2007/0214342 | A1* | 9/2007 | Newburn .............. G06F 11/348 712/216 |
| 2008/0040321 | A1* | 2/2008 | Baeza-Yates ....... G06F 16/2477 |
| 2010/0262600 | A1* | 10/2010 | Dumon ............. G06F 16/90335 707/725 |
| 2011/0040760 | A1* | 2/2011 | Fleischman ........... G06Q 30/02 707/737 |
| 2012/0023219 | A1* | 1/2012 | Nagai ................... G06F 3/0605 709/224 |
| 2012/0191715 | A1* | 7/2012 | Ruffner .................. G06F 16/93 707/738 |
| 2014/0025808 | A1* | 1/2014 | Ito ........................... H04L 43/10 709/224 |
| 2014/0258789 | A1 | 9/2014 | Sorenson et al. |
| 2014/0324866 | A1 | 10/2014 | Tee et al. |
| 2014/0325364 | A1 | 10/2014 | Tee et al. |
| 2015/0058657 | A1* | 2/2015 | Archer .................... G06F 1/324 713/600 |
| 2015/0161652 | A1* | 6/2015 | Schnabl ............ G06Q 30/0243 705/14.41 |
| 2015/0281025 | A1* | 10/2015 | Wallbaum ............ H04L 43/062 370/252 |
| 2016/0179488 | A1* | 6/2016 | Raman .................. G06F 16/164 717/158 |
| 2017/0070524 | A1* | 3/2017 | Bailey ..................... H04L 41/20 |
| 2017/0193173 | A1* | 7/2017 | Miller ................... G16H 10/60 |
| 2017/0235623 | A1* | 8/2017 | Brew ................... G06F 11/079 714/37 |
| 2018/0097687 | A1* | 4/2018 | Brown ................ H04L 41/0609 |
| 2018/0123864 | A1* | 5/2018 | Tucker .................. H04L 41/065 |
| 2018/0150750 | A1* | 5/2018 | Verdejo .................... G06N 5/02 |
| 2018/0241654 | A1* | 8/2018 | Danichev .............. H04L 43/067 |
| 2018/0285233 | A1* | 10/2018 | Norrie ................. G06F 11/3495 |
| 2019/0089576 | A1* | 3/2019 | Willhoit ............... G06F 16/2228 |
| 2019/0197424 | A1* | 6/2019 | Grehant ................ G06K 9/6215 |
| 2019/0243753 | A1* | 8/2019 | Zhang .................... G06F 9/5005 |
| 2019/0245905 | A1* | 8/2019 | Mehta .................. H04L 65/601 |
| 2019/0394251 | A1* | 12/2019 | Mehta .................. H04L 65/602 |
| 2020/0047914 | A1* | 2/2020 | Martin ................... B64D 45/00 |
| 2020/0160189 | A1* | 5/2020 | Bhattacharjya ......... G06F 9/542 |

OTHER PUBLICATIONS

Mining Alarm Clusters to Improve Alarm Handling Efficiency by Klaus Julisch; IBM Research; Zurich Research Laboratory—2001.
International Search Report for International application No. PCT/EP2016/055740—Sep. 14, 2016.

\* cited by examiner

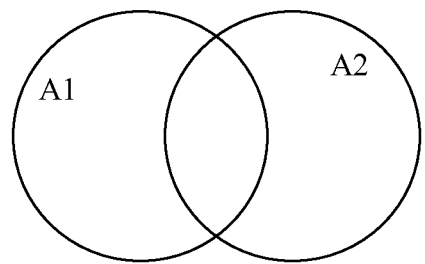
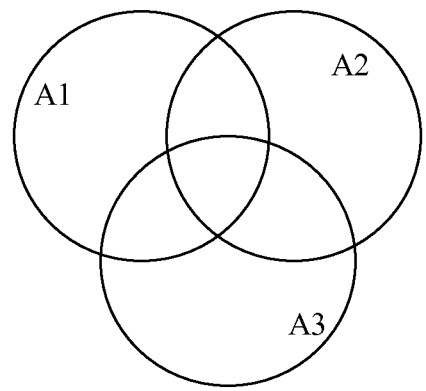
*Fig. 2A*  *Fig. 2B*
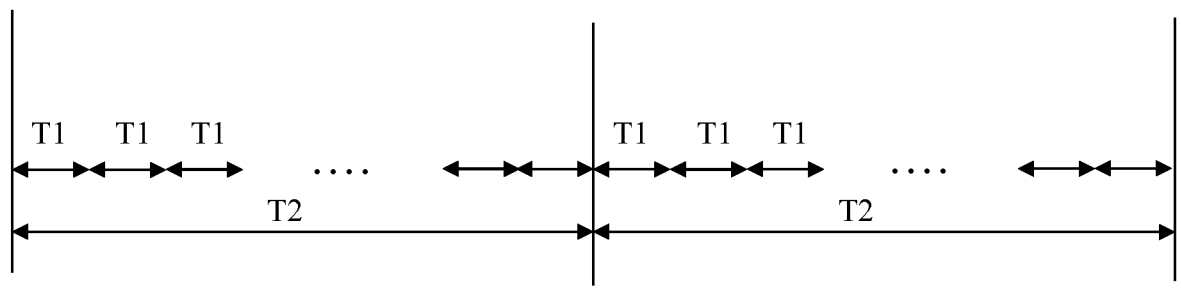
*Fig. 3*

METHOD AND DEVICE FOR REAL-TIME NETWORK EVENT PROCESSING

PRIORITY

This nonprovisional application is a U.S. National Stage Filing under 35 U.S.C. § 371 of International Patent Application Serial No. PCT/EP2016/055740 filed Mar. 16, 2016, and entitled "METHOD AND DEVICE FOR REAL-TIME NETWORK EVENT PROCESSING" which is hereby incorporated by reference in its entirety.

TECHNICAL FIELD

The present invention relates to management of a communications network, in general, and in particular to real-time processing of events in a communications network.

BACKGROUND

Network events in network management contain information related to network problems, configuration changes, time information and performance characteristics, network status information, etc. Alarms and CM (configuration management) events are examples of network management events. They provide important information for network operators to monitor and control network services. However, a major problem of current network management systems is that, the amount of events/alarms received is far too big for human operators to handle. With the increasing size of the networks (more network nodes deployed in the field), new services being added the scale of this problem is becoming exponential in its nature. The flow of events information received by network management systems is constantly growing and processing those takes time, whereas it is important that, at least some of these events, are handled with minimum delay.

Filtering functions known in the art are generally offered by current management to handle flood of network events. Different filter rules, such as frequency-based filters and threshold based filters can be defined by network operators to reduce number of events that need to be processed. There are some major problems with this approach. It requires defining manually expert rules for the filters to work. It is not flexible and adaptive. Networks are constantly changing, for example their topologies and configurations. The static expert rules are not adaptive and do not respond to network dynamics. For example, if a new alarm is added to the network after network configuration, a filter rule must be manually updated if the network operator wants to capture these newly added alarms.

A more advanced approach known in the art uses machine learning clustering techniques to group alarms to improve their handling efficiency. In these solutions alarms are represented as data vectors. The system computes distances between vectors and then puts alarms with distance between each other below a threshold into a single cluster. Various clustering techniques can be used, for example k-means algorithm. However, there are some limitations with this approach too. Firstly, it is difficult to transform alarms to data vectors for distance computation, especially for text attribute values of alarms. It involves complex natural language processing. For example, it is difficult to give distances between these text values, such as "ss7Mtpl1LossOfSignal" "Active Function Failed" and "RADIUS Accounting Server Switched". Secondly, these systems do not support real-time alarm groups or clusters updating. Alarms and events are continuously arriving in real-time, existing alarms groups needed to be updated for new arrivals. However, these systems only can create brand new set of clusters for new arriving alarms or re-computing whole alarm data set again. Creating brand new clusters for new alarms means that network operators have to deal with multiple alarm clusters related to a same existing network problem. Re-computing the whole alarm data set again is computationally expensive and fails to deliver results in real-time

SUMMARY

It is the object of the present invention to obviate at least some of the above disadvantages and provide an improved method and device for real-time processing of events received from a network.

Accordingly, the invention seeks to preferably mitigate, alleviate or eliminate one or more of the disadvantages mentioned above singly or in any combination.

According to a first aspect of the present invention there is provided a method of real-time processing of events received from a network. The network comprises a plurality of network elements connected by a plurality of links, whereas an event comprises a plurality of attributes. The method comprises maintaining a plurality of counters, including counters indicating numbers of occurrences of instances of specific attributes of received events as well as counters indicating numbers of co-occurrences, within a defined measurement window, of instances of specific attributes of the received events and maintaining a record of instances of specific attributes of recent events received in a time period equal to the measurement window. The method further comprises receiving a first event and increasing respective counters indicating occurrences and co-occurrences of instances of attributes of received events, based on the instances of attributes of the first event. For a first attribute the method further comprises calculating relation measure scores between a first instance of the first attribute of the first event and instances of the first attribute of events recently received in the measurement window, wherein the relation measure score depends on a number of co-occurrences in which the first instance of the first attribute and a second instance of the first attribute were received within the measurement window, the total number of occurrences of the first instance and the total number of occurrences of the second instance. Further, the method comprises identifying a group of events as related based on their relation measure scores and creating incident information based on the information about the identified group of events.

According to a second aspect of the present invention there is provided a device for real-time processing of events received from a network. The network comprises a plurality of network elements connected by a plurality of links, whereas an event comprises a plurality of attributes. The device comprising a processor, a memory and a communications interface, said memory containing instructions executable by said processor whereby said device is operative to maintain a plurality of counters, including counters indicating numbers of occurrences of instances of specific attributes of received events as well as counters indicating numbers of co-occurrences, within a defined measurement window, of instances of specific attributes of the received events and to maintain a record of instances of specific attributes of recent events received in a time period equal to the measurement window. The device is further operative to receive a first event via the communications interface and increase respective counters indicating occurrences and co-occurrences of instances of attributes of received events, based on the instances of attributes of the first event. Further, the device is operative to calculate relation measure scores, for a first attribute, between a first instance of the first attribute of the first event and instances of the first attribute of events recently received in the measurement window, wherein the relation measure score depends on a number of co-occurrences in which the first instance of the first attribute and a second instance of the first attribute were received within the measurement window, the total number of occurrences of the first instance and the total number of occurrences of the second instance. The device is further operative to identify a group of events as related based on their relation measure scores and to create incident information based on the information about the identified group of events.

According to a third aspect of the present invention there is provided a device for real-time processing of events received from a network. The network comprises a plurality of network elements connected by a plurality of links, whereas an event comprises a plurality of attributes. The device comprises a plurality of counters, including counters indicating numbers of occurrences of instances of specific attributes of received events as well as counters indicating numbers of co-occurrences, within a defined measurement window, of instances of specific attributes of the received events. The device also comprises means for maintaining a record of instances of specific attributes of recent events received in a time period equal to the measurement window and an interface for receiving a first event. Further the device comprises means for increasing respective counters indicating occurrences and co-occurrences of instances of attributes of received events, based on the instances of attributes of the first event. Said device for real-time processing of events received from a network also comprises means for calculating relation measure scores, means for identifying a group of events as related and means for creating incident information. The means for calculating relation measure scores are adapted to, for a first attribute, calculate relation measure scores between a first instance of the first attribute of the first event and instances of the first attribute of events recently received in the measurement window. The relation measure score depends on a number of co-occurrences in which the first instance of the first attribute and a second instance of the first attribute were received within the measurement window, the total number of occurrences of the first instance and the total number of occurrences of the second instance. The means for identifying a group of events as related are adapted to identify a group of events as related based on their relation measure scores. The means for creating incident information are adapted to create incident information based on the information about the identified group of events.

Further features of the present invention are as claimed in the dependent claims.

BRIEF DESCRIPTION OF THE DRAWINGS

The present invention will be understood and appreciated more fully from the following detailed description taken in conjunction with the drawings in which:

FIGS. 2A and 2B is a diagram illustrating identifying related events as an intersection of groups of events in one embodiment of the present invention;

FIG. 3 is a diagram illustrating time periods in in which the method of real-time processing of network events operates in one embodiment of the present invention;

DETAILED DESCRIPTION

In the following description, for purposes of explanation and not limitation, specific details are set forth such as particular architectures, interfaces, techniques, etc. in order to provide a thorough understanding of the invention. However, it will be apparent to those skilled in the art that the invention may be practiced in other embodiments that depart from these specific details. In other instances, detailed descriptions of well-known devices, circuits, and methods are omitted so as not to obscure the description of the invention with unnecessary details.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" or "in an embodiment" in various places throughout the specification are not necessarily all referring to the same embodiment. Further, the particular features, structures or characteristics may be combined in any suitable manner in one or more embodiments.

Figure 4:
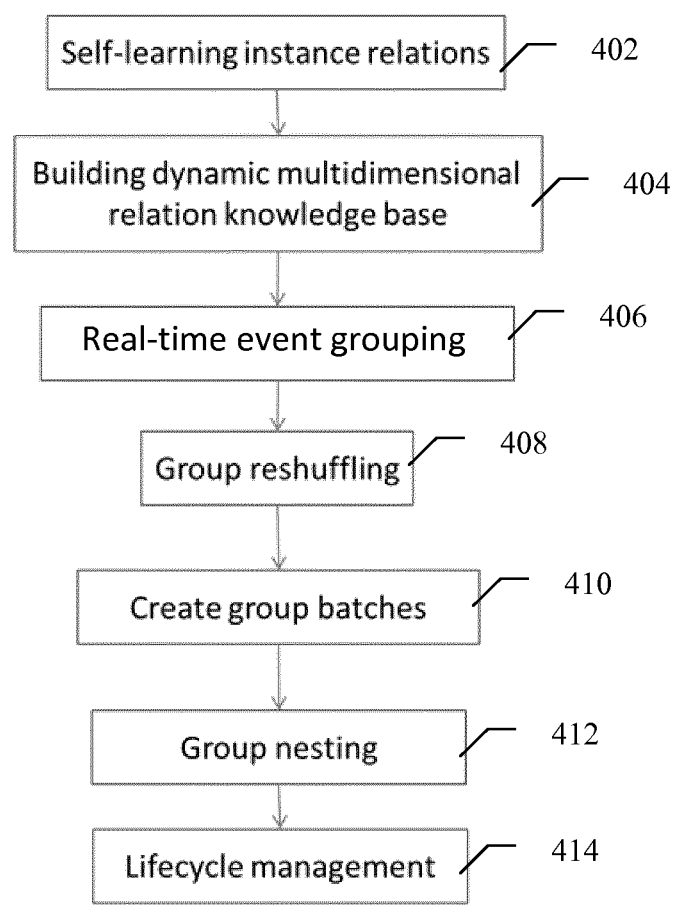
FIG. 4 is a flowchart illustrating a method of real-time processing of network events in one embodiment of the present invention.

Operations of the method in embodiments of the present invention will be described with reference to FIGS. 1 and 4 providing a broad illustration of the operations involved in real-time processing of events in a communications network. More detailed FIGS. 2A, 2B, 3, 5 to 8 illustrate details of various embodiments.

Figure 1:
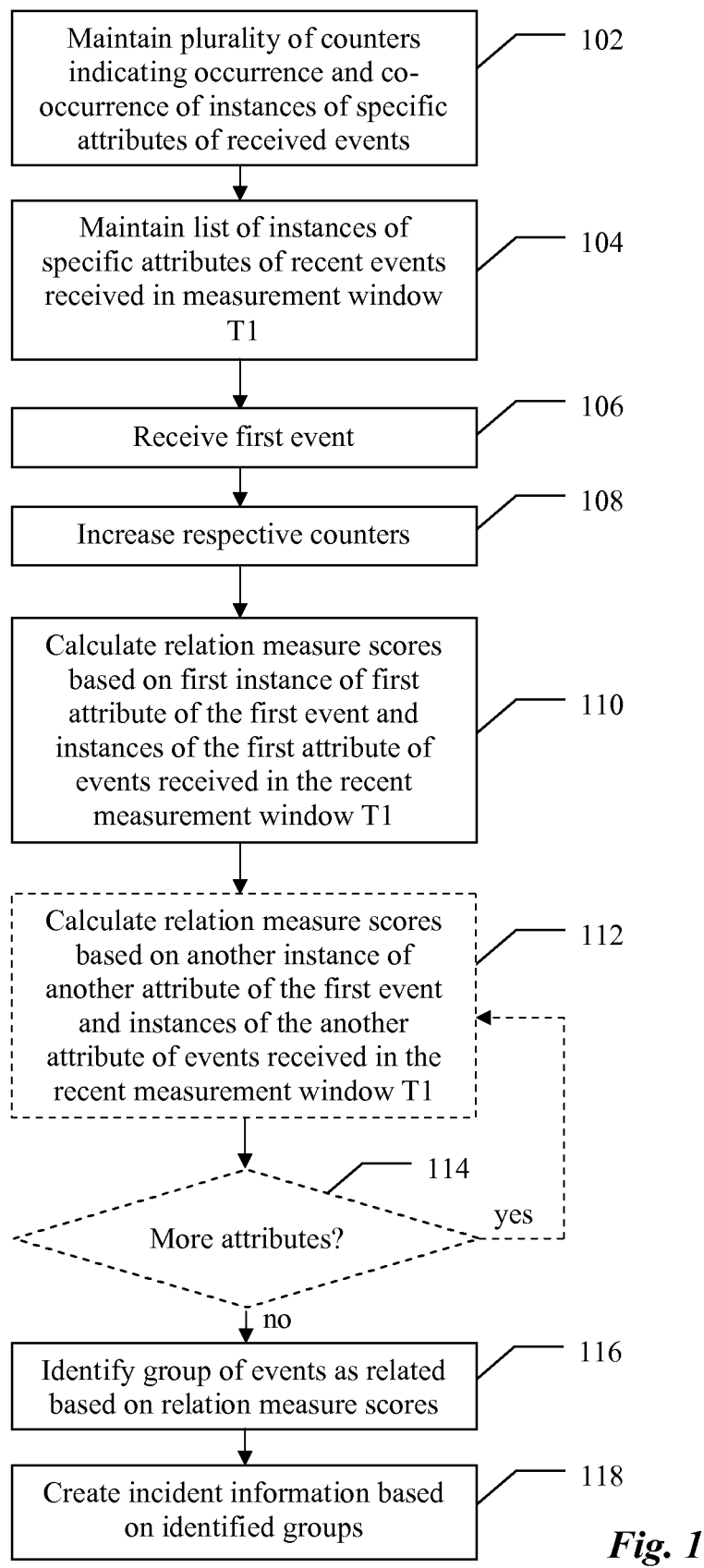
FIG. 1 is a flowchart illustrating a method of real-time processing of network events in one embodiment of the present invention.

With reference to FIG. 1 an embodiment of a method of real-time processing of events received from a network will now be described. The network, which in one embodiment may be a mobile wireless communications network, comprises a plurality of network elements connected by a plurality of links. An event, in the embodiments of the invention is a notification of something that happened in the network and which affects the operations of the network. Examples of events include alarms (alarm is a persistent indication of a fault condition) and configuration changes. The present invention in its embodiments is especially beneficial in real-time processing of alarms, which are much harder to process because their occurrence is not planned as opposed to configuration changes.

Network events, such as alarms have plurality of attributes, such as TOPOLOGY and SPECIFIC_PROBLEM, which characterise the event. Each attribute can be considered as a dimension of the event. In a simple example an alarm may have two attributes: SPECIFIC_PROBLEM, which identifies what happened that gave rise to the alarm, and TOPOLOGY, which provides information about location of the problem in the network. Different data instances of an attribute can be considered as object instances. For example, ss7Mtpl1LossOfSignal and RADIUS Accounting Server Switched are instances of a SPECIFIC_PROBLEM.

In its preferred embodiment illustrated in solid lines in FIG. 1 the method comprises maintaining, 102, a plurality of counters, including counters indicating numbers of occurrences of instances of specific attributes of received events as well as counters indicating numbers of co-occurrences of instances of specific attributes of the received events. Instances of specific attributes are considered to co-occur if their events are received within a defined measurement window. The assumption made by the inventors was that if two events are related they should occur within a relatively short period of time, which is referred to in this document as a measurement window, T1. The length of the measurement window may be adjusted in individual implementations of the invention. The inventors found that an embodiment with the measurement window lasting for 90 seconds produces particularly good results. However, shorter (e.g. 10 seconds) and longer (e.g. 300 seconds) measurement windows are also possible. If the measurement window is kept short the likelihood that events that happen in a single measurement window are related is high, but at the same time some events that are in fact related may fall outside this short measurement window and will not be processed as related. Increasing the length of the measurement window will allow for capturing the related events that were outside the short measurement window, but it may also produce false-positive indications of related events. However, the present invention in its embodiments provides mechanisms for eliminating, at least partially, these false-positives.

The method further comprises maintaining, 104, a record of instances of specific attributes of recent events received in a time period equal to the measurement window. The record of instances of specific attributes of recent events received in a time period equal to the measurement window in one embodiment is maintained as a list. Therefore the method looks at the events received in the last X seconds, where X indicates the length of the measurement window, T1, e.g. 90 seconds.

In step 106, a first event is received. As explained earlier, the first event is characterised by specific instances of its attributes and the method then comprises increasing, 108, respective counters indicating occurrences and co-occurrences of instances of attributes of received events, based on the instances of attributes of the first event. If it is assumed that the first event has two attributes TOPOLOGY and SPECIFIC_PROBLEM then respective counters for the specific instances of attributes are updated, 108. The method also checks other events received in the recent measurement window T1 and updates, 108, counters that record numbers of co-occurrences of instances of attributes of arriving events.

Once the counters are updated the method progresses to calculating, 110, a relation measure score based on at least one instance of one attribute of the first event and instances of the same attribute of the events received within the recent measurement window T1, and information available from the counters. The relation measure score depends on a number of co-occurrences in which the first instance of the first attribute and a second instance of the first attribute were received within the measurement window, the total number of occurrences of the first instance and the total number of occurrences of the second instance. To calculate the relation measure score one of a number of equations may be used:

$$\text{score}(x_1, x_2) = \frac{\text{occurences of } (x_1 \cap x_2)}{\max(\text{occurences of } x_1, \text{occurences of } x_2)} \quad \text{(Eq. 1)}$$

$$\text{score}(x_1, x_2) = \frac{\text{occurences of } (x_1 \cap x_2)}{\text{occurences of } (x_1 \cup x_2)} \quad \text{(Eq. 2)}$$

$$\text{score}(x_1, x_2) = \frac{\text{occurences of } (x_1 \cap x_2)}{\text{occurences of } x_1 + \text{occurences of } x_2} \quad \text{(Eq. 3)}$$

$$\text{score}(x_1, x_2) = \frac{\text{occurences of } (x_1 \cap x_2)}{\text{occurences of } x_1 * \text{occurences of } x_2} \quad \text{(Eq. 4)}$$

$$\text{score}(x_1, x_2) = \frac{\text{occurences of } (x_1 \cap x_2)}{\text{constant}} \quad \text{(Eq. 5)}$$

In the formulas above $x_1$ and $x_2$ denote two instances of an attribute x of two events. To calculate a relation score between $x_1$ and $x_2$, one or multiple of the following equations may be used. When multiple equations are used, then a weight average value of multiple scores may be used in calculating a final score.

When the calculations are done the relations of instances of the attribute x of the recent events can be represented as key-value pairs, where key is a pair of attribute instance, and the value is a relation measure score. For example:

Key: $x_1$, $x_2$; Score: 0.85
Key: $x_1$, $x_3$; Score: 0.25
Key: $x_1$, $x_4$; Score: 0.70
Key: $x_1$, $x_5$; Score: 0.23
Key: $x_2$, $x_4$; Score: 0.72
. . .

In a preferred embodiment when a new event arrives the calculation of the relation measure scores between pairs of instances of attributes of events from the recent measurement window T1 includes calculating the relation measure score for each pair of instances of an attribute for events in the pool of events from the recent measurement window T1, including the first event. Alternatively, the calculation covers only pairs of instances of a first attribute of events in the pool with the first attribute of the first event.

As one can see the relation measure score indicates how strongly the instances are related and in consequence it shows how strongly the first event is connected with other events received in the recent measurement window T1. In the five examples above instances $x_1$ and $x_2$ have stronger relation that instances $x_1$ and $x_5$. This indicates that their corresponding events (i.e. the first event characterised by $x_1$ and another event $x_2$) are related.

The relation score is self-learned from observations of co-occurrence patterns of event history, 402. The big advantage is that the history of events is recorded in easily accessible counters, which means that there is no need to analyse past events, but only read the correct counter value. This allows for real-time operation of the method because access to all counters is the same and very fast. More detailed historical information is maintained about the events received in the recent measurement window, e.g. in the last 90 seconds. The amount of information received during the measurement window can be easily processed and this does not affect the ability to operate in real-time. Another advantage is that the expert knowledge or domain knowledge is not necessary at all in the approach defined in embodiments of this invention.

Once the relation measure scores are calculated, 110, the groups of events are identified as related, 116, based on their relation measure scores. In one embodiment, if the relation measure score is equal or exceeds a defined threshold the corresponding pairs of events are identified as related. If, for example, the threshold is set at 0.7 then we can see that from the instances $x_1$, $x_2$, $x_3$, $x_4$ and $x_5$ instances $x_1$, $x_2$ and $x_4$ are related:

Key: $x_1$, $x_2$; Score: 0.85
Key: $x_1$, $x_4$; Score: 0.70
Key: $x_2$, $x_4$; Score: 0.72

In consequence, events that correspond to these instances of attributes are related too. Once a group of related events is identified the method creates, 118, incident information based on the information about the identified group of events. The incident information may be presented to a network management system or a network operator for information or actioning. The advantage of this solution is that instead of presenting large number of events the invention in its embodiments reduces the amount of information presented to the network management system or network operator by avoiding repeated reporting of events related to the same cause. The mechanism described shows real time event grouping that leads to construction of an incident information. A set of events closely related or typically stemming from the same root cause will be grouped together as a single network incident representation.

The above described embodiment can be further improved by including calculation, 112, of relation measure scores for further attributes, 114, of the first event and identifying further groups of related events based on their relation measure scores. Calculating relation measure scores for the remaining, further, attributes follows the same rules as explained in the above described embodiment.

If only one attribute is considered in calculating the relation measure score the events are analysed in a single dimension (e.g. SPECIFIC_PROBLEM). If we add calculating the relation measure scores from more attributes the analysis become multidimensional. Analysing one attribute (e.g. SPECIFIC_PROBLEM) may produce a group of related instances (and related events), but analysis of the same set of events based on another attribute (e.g. TOPOLOGY) may produce a group of instances (and in consequence a group of events) which is different from the one identified for SPECIFIC_PROBLEM. Therefore, in a preferred embodiment identifying a group of events as related is based on events that belong to an intersection of the groups of related events. This is illustrated in FIG. 2A for an embodiment where events are analysed based on two attributes A1 and A2 (dimensions) and 2B for an embodiment where events are analysed based on three attributes A1, A2 and A3 (dimensions). Relations between alarms that are related in more than one dimension (i.e. they belong to the intersection) are stronger and this smaller set forms a basis for incident. By analysing events for more than one attribute it is possible to eliminate at least some of the false-positive indications resulting from the longer measurement window, T1.

Identifying events as related based on more than one attribute increases the confidence of the results of processing the events.

Since network is constantly changing, the relations might change as well. In embodiments of the present invention the relation measure scores are updated by continuous learning from the network behaviour. The various counters, information about events received in the recent measurement window, information about groups of related events form a dynamic relation knowledge base which is constantly being updated, 404, as a result of the changing network. When the counter values are updated as part of the continuous learning, the relation score is re-evaluated to capture the network dynamics.

Let x and y be two attribute examples of network events, then, in one embodiment the dynamic multidimensional relation knowledge base can be represented as follow:

| | |
|---|---|
| Key: $x_1$, $x_2$; Count: 10, 12, 13; Score: 0.76 | Key: $y_1$, $y_2$; Count: . . . ; Score: . . . |
| Key: $x_1$, $x_3$; Count: 8, 12, 16; Score: 0.50 | Key: $y_3$, $y_2$; Count: . . . ; Score: . . . |
| Key: $x_4$, $x_5$; Count: 10, 19, 13; Score: 0.52 | Key: $y_1$, $y_5$; Count: . . . ; Score: . . . |
| . . . | . . . |

In the table above, in the first row, the number in the first position indicates the count of co-occurrences of $x_1$ and $x_2$ in the same measurement window T1 (i.e. 10); the second number indicates the count of occurrences of $x_1$ (i.e. 12) and the third number indicates the count of occurrences of $x_2$ (i.e. 13). The value of score has been calculated using equation 1. The same is applicable to the remaining examples.

In one embodiment, in the knowledge base only the counts are recorded and are constantly updated when new events arrive whereas the scores are calculated on the fly when needed. In alternative embodiments also the scores may be recorded in the knowledge base and they are updated when new events arrive.

Looking for alarms belonging to the intersection as explained in description of embodiment illustrated in FIGS. 2A and 2B is one way of identifying related alarms with good confidence. An alternative embodiment described below is based on calculating relation measure score between the first event and each event recently received in the measurement window, T1. In particular identifying a group of events as related comprises calculating average values of relation measure scores of all attribute instance relations between the first event and each one of the events recently received in the measurement window, T1, and identifying a group of events as related based on events having the calculated average value at or above a first threshold. This embodiment is particularly useful in situations when there is no group existing. For situations when there is at least one group already in existence a separate embodiment will be described below.

Identifying related events by calculating in real-time relation measure score between the first event and each event recently received in the measurement window, T1 may be carried out by performing calculations based on equation 6 (see below). In the particular embodiment represented by equation 6 the relation measure score calculation is based on a weighted average of all attribute instance relations between two events. It is worth to note that using weighting factors $w_x$ is optional—in one embodiment all weighting factors may be equal, which has the same effect as not using weighting factors at all.

Let $a=x_1, y_4, \ldots, z_4$ denote the first event characterised by multiple attribute values of $x_1, y_4, \ldots, z_4$ and $b=x_2, y_2, \ldots, z_3$ denote an event received in the recent measurement window T1. The relation score between events a and b is calculated using the following equation:

$$\text{score\_ee}(a, b) = \frac{\text{score}(x_1, x_2)w_x + \text{score}(y_4, y_2)w_y + \ldots + \text{score}(z_4, z_3)w_z}{n} \quad \text{(Eq. 6)}$$

where n is the number of attributes which characterise an event, score $(x_1, x_2)$ is a relation measure score for instances $x_1$ and $x_2$ for attribute x of the events a and b and similarly the relation measure scores for instances of attributes y and z. The value of score $(x_1, x_2)$ is calculated based on one of the equations 1-5 disclosed earlier. As explained earlier $w_x$ is an optional weighting factor for the attribute. For example, relation of TOPOLOGY attribute may be more important than other attributes, so it could have a higher weight that the remaining attributes.

If there is at least one group of related events already in existence then a newly arrived first event may be added to this existing group if the first event and the existing group are related (i.e. the existing group may be updated). The operation of grouping events (i.e. combining with existing group or creating a new group of events) is performed in real time, 406, based on an embodiment now to be described. In this embodiment identifying a group of events as related comprises calculating an average value of relation measure scores of all instances of attributes between the first event and all events in one of existing groups of events received in a current batch and repeating the operation of calculating an average value of relation measure scores for the first event and events in other existing groups of events in the current batch. Once the relation measure score are calculated the method in this embodiment comprises managing the grouping of events based on these calculated average values. The first event may be added to an existing group or a new group may be formed with the first event. To make processing of events less computation expensive in a preferred embodiment the grouping is performed in batches. A batch of groups is created over a second time period T2, which is longer than the measurement window T1 (FIG. 3 illustrates this). Once the second time period expires the current batch is closed and a new one is started. More details about creating batches will be described in the following parts of this document.

In one embodiment the method comprises updating an existing group of events by adding the first event to the existing group of events if the average value of relation measure scores of all instances of attributes between the first event and all events in the existing group is at or above a second threshold. If, however there is more than one existing group of related events and the average value of relation measure scores of all instances of attributes between the first event and more than one existing group is at or above said second threshold then the first event is added to the existing group with which the average relation measure score is the highest.

Alternatively, the real-time grouping, 406, of events may comprise creating a new group of events if the highest average value of relation measure scores of all instances of attributes between the first event and all events in the existing groups is below said second threshold. This indicates that the first event is not related to any of the existing groups and therefore a new group should be created.

In the above embodiments the calculation of the relation measure score for the real-time grouping, 406 is based on an average between an event and every event of a group.

Let $g=b_{g1}, b, \ldots, b_{gn}$ denote an existing group g which comprises a number of events: $b_{g1}, b_{g2}, \ldots, b_{gn}$. The relation measure score between the group g and the first event a may be calculated using the following equation:

$$\text{score\_ge}(g, b) = \frac{\text{score\_ee}(b_{g1}, a) + \text{score\_ee}(b_{g2}, a) + \ldots + \text{score\_ee}(b_{gn}, a)}{n+1}, \quad \text{(Eq. 7)}$$

where n is the number of events in the group g and score_ee $(b_{g1}, a)$ and corresponding expressions for $b_{g2}$ through to $b_{gn}$ define relation measure score function between the first event a and each one of the events $b_x$ from the group g calculated using equation 6.

Since network events are generated and arrive in real-time the grouping algorithm is designed to group the arriving events in real-time too. Let a denote the first event, which arrived in the system. The following algorithm is used to manage the event grouping of the first event a.

---

If there is no group existing,
    Create a new group which contain event a
If there exist more than one group of events,
    Use score_ge(g, a) function to calculate relation measure scores between event a with every existing group
If the highest relation measure score < second threshold,
    Create a new group which contains the event a
    Else,
        Add event a to the group which has the highest relation measure score with event a

---

The network changes in time, faults develop, new network elements are being added and old removed and in consequence the groups of related events change too. As a consequence, a group to which an event had been added may not be the best group some time later. In other words, at some point in time an event of a group may be closer related to another group of events due to changes of the network. Group reshuffling, illustrated as step 408 in FIG. 4, is a technical step addressing this problem.

Figure 5:
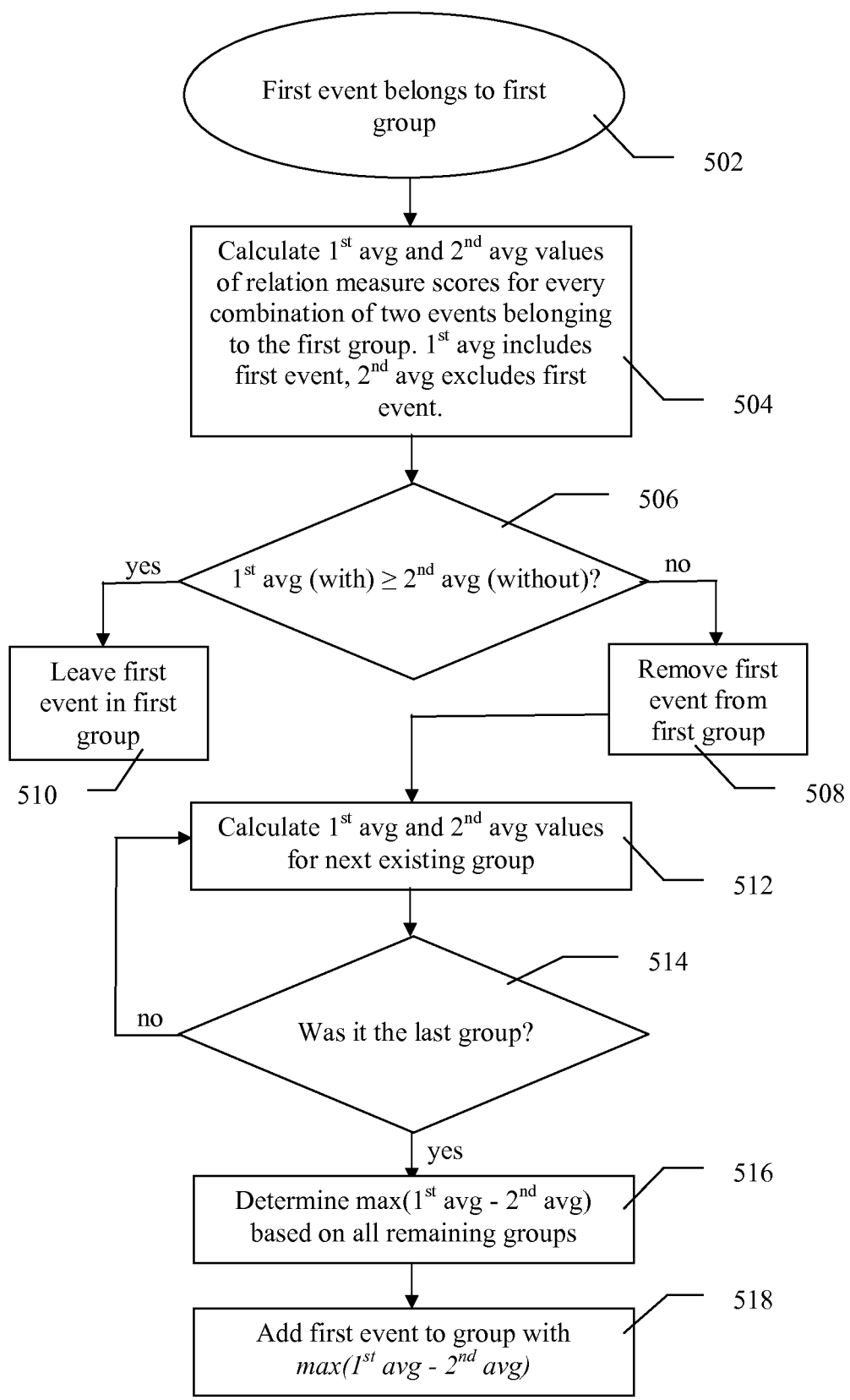
FIG. 5 is a flowchart illustrating an embodiment of reshuffling of events in a method of real-time processing of network events in one embodiment of the present invention.

In one embodiment the group reshuffling, 408, is carried out as described below. One embodiment of group reshuffling is illustrated in FIG. 5. If the first event belongs to a first group of events, 502, the method comprises calculating, 504, a first average value of relation measure scores for every combination of two events belonging to the first group of events and calculating, 504, a second average value of relation measure scores for every combination of two events belonging to the first group of events. In calculating the second average the first event is excluded from the calculation. In this way it is checked if the average relation measure score for a group is better with or without the first event. The order of calculation of the average values (the first before the second or the other way round) is irrelevant for the operation of the method in its embodiments.

If the second average value of relation measure scores (i.e. calculated for the first group without the first event) is higher than the first average value of relation measure scores, 506, it indicates that the relation of events in the first group is stronger if the first group does not comprise the first event. In this situation the method comprises removing, 508, the first event from the first group of events and calculating average values of relation measure scores for the remaining existing groups, 512-514, wherein for each one of the remaining existing groups the average value of relation measure score is calculated with the first event and without the first event. The operations of calculating average values of the relation measure score are effectively repetitions of the calculations, 504, for the first group discussed above. For each group we calculate the relation measure score with and without the first event. If the event is related to a group then the relation measure score calculated with the first event will be higher than relation measure score for this group calculated without the first event. The method further comprises adding the first event to the one of the existing groups for which the addition of the first event produces the highest increase of the average value of relation measure score, 516, 518. If there is a plurality of existing groups it may be that the relation measure score increases with the addition of the first event for more than one group. In this situation the highest increase determines the groups to which the first event is added.

Of course, if the first average value of relation measure scores for the first group (i.e. calculated in step 504 for the first group with the first event) is higher than the second average value of relation measure scores, 506, it indicates that the relation of events in the first group is stronger if the first group does comprise the first event. In consequence the first event remains in the first group, 510.

One of the advantages of group reshuffling is that it helps eliminating at least some of the false-positive indications resulting from the longer measurement window, T1.

Calculating the average value of relation measure scores for every combination of two events belonging to a group of events is in fact calculating a relation measure score of the group itself. Equation 8 below allows for calculating this score:

$$\text{score\_g}(g) = \frac{\text{score\_ee}(a_1, a_2) + \ldots + \text{score\_ee}(a_1, a_n) + \text{score\_ee}(a_2, a_3) + \ldots + \text{score\_ee}(a_{n-1}, a_n)}{n(n-1)/2} \quad \text{(Eq. 8)}$$

where $g=a_1, a_2, \ldots, a_n$ denotes an event group g comprising n events $a_1, a_2, \ldots, a_n$; $n(n-1)/2$ is the number of possible two event combinations of a group having n events and $\text{score}_{ee}(a_1, a_2)$, and corresponding expressions, defines relation measure score function between a pair of events belonging to group g calculated using equation 6.

An algorithm implementing group reshuffling will check every event in current group and determine if an event needs to be moved to another group. Let e denote an event of one group, the following algorithm is used to reshuffle events between groups.

---

Use score_g(g) function to calculate relation measure score of the current group as scoreBefore.
Remove event e from the current group
Use score_g(g) function to calculate relation measure score of the current group as scoreAfter
    If scoreBefore < scoreAfter
        Pick another group and use score_g( ) to calculate the
        relation measure score (scoreB1) of the group and after
        adding event e to the group calculate the relation measure
        score again (scoreA1)
        Calculate the relation measure score change by using
        scoreA1- scoreB1
        Pick yet another group and carry out calculation of
        relation measure score with and without event e and
        calculate the relation measure score change
            Select the group that has the biggest positive relation
            measure score change
                If the relation measure score change for the
                group is positive or scoreA1- scoreB1≥0
                      Move the event from its current
                      group and add it to the selected
                      group.

---

The system implementing the invention in its various embodiments constantly receives events and after a period of time, there will be a large number of events counted and a large number of groups formed. The grouping process may become very computation expensive when a new event arrives because the method would have to go through the existing grouping information. To process and update existing incidents and process arriving events in real-time, or near real-time, with minimal computational effort this embodiment proposes to process arriving events in separate, batches, 410. As a result, each batch only has a relatively small number of events and groups to be processed. For a new event it is only needed to update existing groups within the current batch.

In this embodiment a second time period, T2, is defined which is longer than the measurement window, T1, used for determining of co-occurrences. Grouping within a batch is processed during this second time period. Once the second period, T2, expires the information about created groups of related events is recorded as historical information and then the whole grouping starts again. In a preferred embodiment, however, the counters indicating numbers of occurrences of instances of specific attributes of received events as well as counters indicating numbers of co-occurrences of instances of specific attributes of the received events are not re-set at the expiry of the second time period T2, they continue to run. The relation between the measurement window T1 and the second time period T2 is illustrated in FIG. 3.

Preferably, when the second period of time, T2, expires, grouping process is frozen after the group reshuffling process. As a result, we have a set of groups formed in different time windows for different batches. The real-time grouping and group reshuffling processes described above process events within a same batch. Each batch comprises a number of small groups.

By splitting the processing of events into limited periods of time and producing batches of groups the processing consumes computational resources at a level that allows the method in its embodiments to operate in real-time.

Although creating groups in batches has the advantage of reducing consumption of computational resources the method can be improved even further by applying, in preferred embodiments, so called group nesting, 412. Group nesting, 412, is a step aimed at combining groups from different batches. Batches contain historical data and they can be processed off-line and this does not have negative effect on real-time processing of events in the current batch (i.e. batch being created in the current second time period T2). This is because the real-time processing of events and groups in the current batch operates on much smaller amount of data compared with the historical information in the earlier batches and because the processing of the events and groups in the current batch does not depend on processing of the earlier batches. The operations on the current batch and operations on earlier batches are independent and can be run in parallel.

Figure 6:
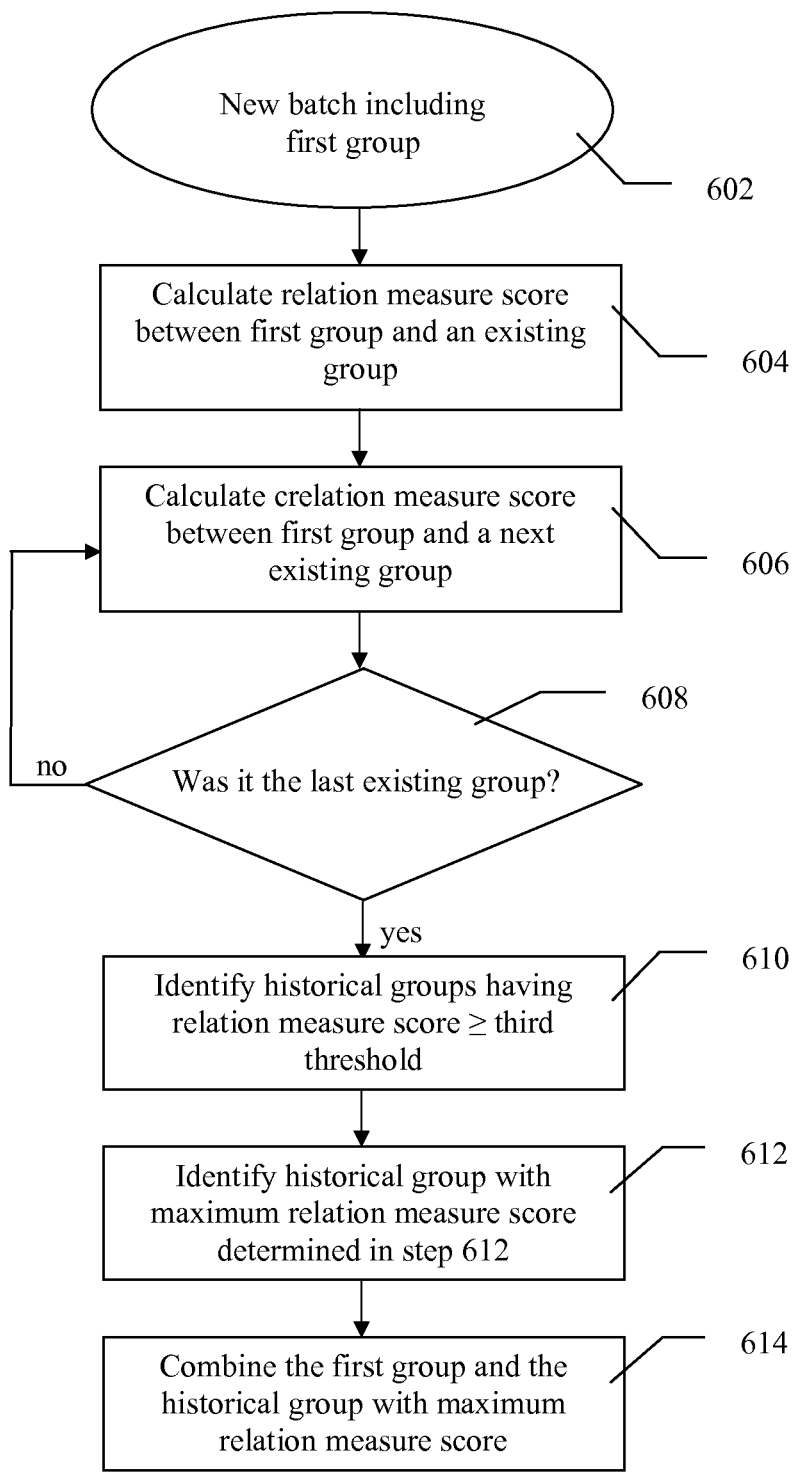
FIG. 6 is a flowchart illustrating an embodiment of group nesting in a method of real-time processing of network events in one embodiment of the present invention.

When group nesting is carried out a group can either be a parent group or a child group. A parent group may contain several children groups. One embodiment of the process of group nesting is illustrated in FIG. 6. When a new batch arrives, 602, a group in the batch will become either a child of an existing parent group or a new parent group based on the relation measure scores between a newly arrived group and existing parent groups. As the result, a bigger group may be created by using smaller groups. The method in a preferred embodiment only computes relation measure scores between groups of the new batch and existing parent groups rather than all groups to reduce the computation complexity (i.e. the method does not compute relation measure scores between groups of the new batch and child groups of the existing parent groups). For example, let's consider group_1, group_2, group_3 and group_4. Let's assume that group_1 was assigned the role of the parent group and group_2, group_3 and group_4 are all children group of group_1. When a new group_6 arrives, the method in its preferred embodiment checks if group_6 and the parent group_1 are related. If they are related, then we put group_6 as a new child of group_1. We do not compare group_6 with children groups 2, 3 and 4. In this way the computation complexity is reduced.

Once a batch is created it becomes historical information in the sense that once the second time period T2 expires a batch is created and new second time period starts and a new, current batch is being created. In a preferred embodiment nesting, 412, of groups of events comprises combining a first historical group of events with another historical group of events recorded in the historical information if a relation measure score, calculated 604 as explained below, of these two groups is at or above a third threshold, 610. Preferably, selecting said another historical group of events for combining it with the first historical group of events comprises calculating relation measure scores between the first historical group of events and all historical groups, 604-608, of events recorded in the historical information. Once these are calculated the method comprises selecting the historical group of events for which the calculated relation measure score with the first historical group of events is the highest, 612, of the relation measure scores that are at or above the third threshold, 610. Once a pair like this is found the two groups are combined, 614.

In a preferred embodiment, the relation measure score for group nesting is calculated based on an average between an event and every event of a group, see equation 9.

$$\text{score\_gg}(g, p) = \frac{\text{score\_ge}(p, a_{g1}) + \text{score\_ge}(p, a_{g2}) + \ldots + \text{score\_ge}(p, a_{gn})}{n}, \quad \text{(Eq. 9)}$$

where $g=a_{g1}, a_{g2}, \ldots, a_{gn}$ denote an event group g comprising n events $a_{g1}, a_{g2}, \ldots, a_{gn}$ (this may be, for example, the first historical group), p is another historical group, for example a parent group, n is the number of events in group g and $\text{score}_{ge}(p,a_{g1})$ and corresponding expressions in equation 9 define relation measure score between a group and an event as defined in equation 7.

One possible example of an algorithm implementing group nesting is presented below. Let g denote a group arrived in the system in a group batch.

```
If there is no parent group existing,
    Assign group g as new parent group
If there are number of parent groups already existing,
    Use score_gg( ) function to calculate relation measure scores
    between group g and every existing parent group.
        If the highest relation score < defined threshold,
            Assign group g as new parent group
        Else,
            Add group g as child of the parent group which has
            the highest relation score with group g
```

The operations of grouping, group reshuffling, creating batches and nesting are performed in a preferred embodiment in order to increase confidence level of the real-time grouping. Having reliable grouping allows for creating incident information that accurately reflects situation in the network. After an incident is constructed, the incident enters the lifecycle management, 414. The incident may have different state, such as open or closed. When a new incident is formed, it will be in the open state by default. It means that the incident will be updated in runtime, i.e. new coming groups can be added to the incident if these groups are related to the groups of the incident. When the incident is in a closed state, then the incident cannot be updated. For example, a new event arrives from the network and this opens a new incident. Over time more information is grouped and nested until such time as the events contained within the group behind this incident are each given a cleared or resolved status by the network operator in which case the incident itself then becomes closed and eventually archived. The states of an incident will be managed by both the system and operators.

Figure 7:
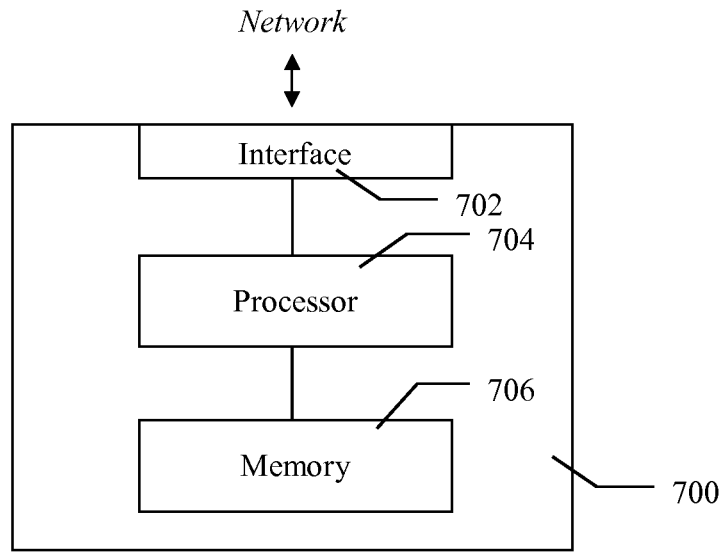
FIG. 7 is a diagram illustrating a device for real-time processing of network events in one embodiment of the present invention.

With reference to FIG. 7 an embodiment of a device for real-time processing of events received from a network will now be described. As explained earlier the network comprises a plurality of network elements connected by a plurality of links, whereas an event comprises a plurality of attributes. The device, 700, comprises a processor 704, a memory 706 and a communications interface 702. The memory, 706, contains instructions executable by said processor, 704. In operation said device is operative to maintain a plurality of counters, including counters indicating numbers of occurrences of instances of specific attributes of received events as well as counters indicating numbers of co-occurrences, within a defined measurement window, of instances of specific attributes of the received events and to maintain a record of instances of specific attributes of recent events received in a time period equal to the measurement window. The device, 700, is operative to receive a first event via the communications interface, 702. In response to the receipt of the first event the device, 700, increases respective counters indicating occurrences and co-occurrences of instances of attributes of received events, based on the instances of attributes of the first event. The device, 700, is further operative to calculate relation measure scores, for a first attribute, between a first instance of the first attribute of the first event and instances of the first attribute of events recently received in the measurement window. The relation measure score depends on a number of co-occurrences in which the first instance of the first attribute and a second instance of the first attribute were received within the measurement window, the total number of occurrences of the first instance and the total number of occurrences of the second instance. The device is also operative to identify a group of events as related based on their relation measure scores and to create incident information based on the information about the identified group of events.

The communications interface, 702, allows for communication with a network and may be one of well-known interfaces, for example Ethernet. It is possible, however, to connect the device 700 to the network via other well know wired or wireless interface.

Moreover, the device, 700, implements the various embodiments of the method described above and is operative to operate according to the disclosed embodiments of the method separately or in combination.

In particular the device 700 is preferably operative to calculate relation measure scores for further attributes of the first event and identify further groups of related events based on their relation measure scores. This makes the analysis of the events multidimensional. Once the events are analysed in more than one dimension (i.e. more than one attribute are analysed) the device 700 is operative to create the incident information based on events that belong to an intersection of the groups of related events. This is schematically illustrated in FIGS. 2A and 2B.

As described earlier with reference to embodiments of the method in identifying a group of events as related the device 700 is operative to calculate average values of relation measure scores of all attribute instance relations between the first event and each one of the events recently received in the measurement window. In a preferred embodiment equation 6 may be used for this calculation. The device 700 is further operative to identify a group of events as related based on events having the calculated average value at or above a first threshold.

The device 700 in one embodiment, in identifying a group of events as related, is operative to calculate an average value of relation measure scores of all instances of attributes between the first event and all events in one of existing groups of events recently received in the measurement window and to repeat the operation of calculating an average value of relation measure scores for the first event and events in other existing groups of events. Once the calculations are done the device manages the grouping of events based on the calculated average values. The calculations in this embodiment are preferably carried out according to equation 7. Preferably, in managing the grouping of events the device 700 updates an existing group of events by adding the first event to the existing group of events if the average value of relation measure scores of all instances of attributes between the first event and all events in the existing group is at or above a second threshold. If there is more than one existing group for which the average relation measure score is at or above the second threshold then the device 700 is operative to add the first event to the one of the existing groups for which the average relation measure score is the highest. Alternatively, if the highest average value of relation measure scores of all instances of attributes between the first event and all events in the existing groups is below a second threshold the device creates a new group of events.

In a preferred embodiment each relation measure score used in calculating the average value is multiplied by a weighting factor.

In yet another preferred embodiment the device 700 is operative to perform reshuffling of events between groups as described in embodiments of the method of the invention. If the first event belongs to a first group of events the device 700 calculates a first average value of relation measure scores for every combination of two events belonging to the first group of events and calculates a second average value of relation measure scores for every combination of two events belonging to the first group of events excluding the first event. The order of calculation of the average values (first before the second or the other way round) is irrelevant. Equation 8 provides one possible way of carrying out the calculations in the operation of reshuffling.

If the second average value of relation measure scores is higher than the first average value of relation measure scores the device is operative to remove the first event from the first group of events and to calculate average values of relation measure scores for the remaining existing groups. For each one of the remaining existing groups the average value of relation measure score is calculated with the first event and without the first event. The device 700 adds the first event to the one of the existing groups for which the addition of the first event produces the highest increase of the average value of relation measure score. Please refer to equation 9 and description of the embodiment of the method using equation 9 for more details.

Further in one embodiment, the device 700 is operative to perform the operations related to grouping the events for a duration of a second time period and, after expiry of the second time period, the device is operative to record information representative of the groups created in the second time period as historical information and to restart the process of grouping of events for events received after the expiry of the second time period.

Preferably the device 700 is operative to combine a first historical group of events with another historical group of events recorded in the historical information if a relation measure score of these two groups is at or above a third threshold. Preferably, in selecting said another historical group of events the device is operative to calculate relation measure scores between the first historical group of events and all historical groups of events recorded in the historical information and to select the historical group of events for which the calculated relation measure score with the first historical group of events is the highest.

Figure 8:
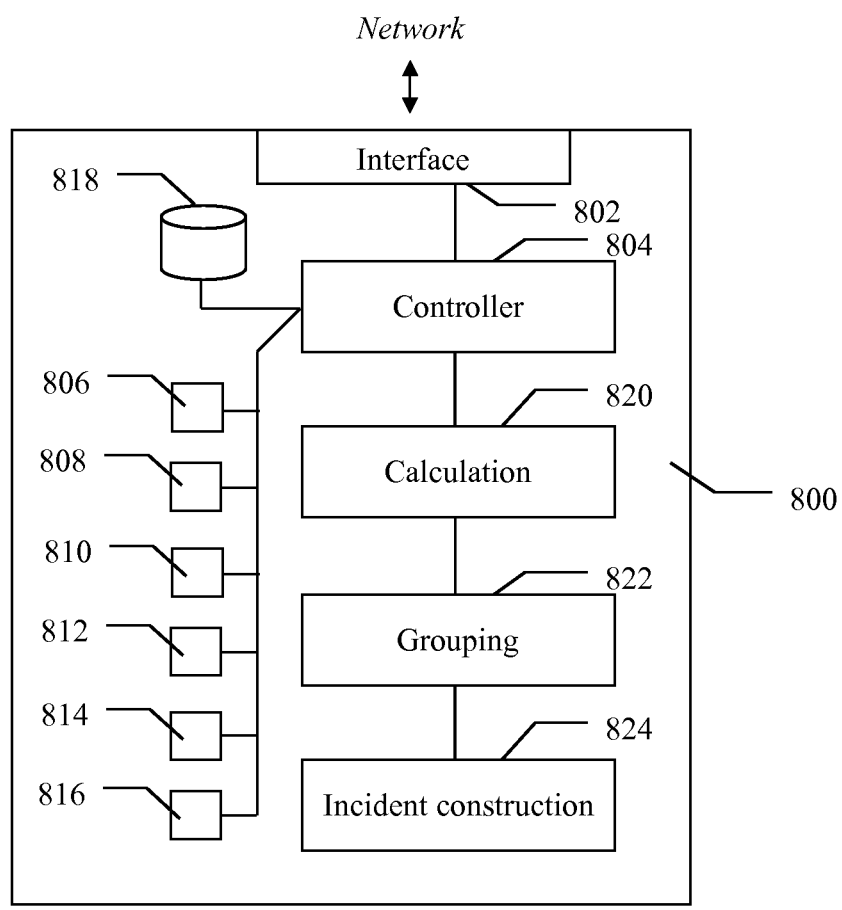
FIG. 8 is a diagram illustrating a device for real-time processing of network events in one embodiment of the present invention.

With reference to FIG. 8 another embodiment of a device for real-time processing of events received from a network will now be described. As explained earlier the network comprises a plurality of network elements connected by a plurality of links, whereas an event comprises a plurality of attributes. The device, 800, comprises a plurality of counters, 806-816, including counters indicating numbers of occurrences of instances of specific attributes of received events as well as counters indicating numbers of co-occurrences, within a defined measurement window, of instances of specific attributes of the received events. The counters, 806-816, are preferably implemented as software functions, but alternative implementations may also be envisaged by a person skilled in the art. The device 800 further comprises means for maintaining a record, 818, of instances of specific attributes of recent events received in a time period equal to the measurement window, T1. The means for maintaining a record, 818, of instances of specific attributes may be implemented as a memory in the form of a hard disk, a flash drive or another device operable to store information. The device, 800, also comprises a communications interface, 804, for receiving a first event. The interface, 802, allows for communication with a network and may be one of well-known interfaces, for example Ethernet. It is possible, however, to connect the device 800 to the network via other well know wired or wireless interface. Further, the device 800 comprises means for increasing respective counters, 804, indicating occurrences and co-occurrences of instances of attributes of received events, based on the instances of attributes of the first event. The means for increasing respective counters, 804, may be implemented as a controller that controls the values of the counters 806-816. The controller, 804, may also control the record, 818, of instances of specific attributes of recent events received in a time period equal to the measurement window, T1.

The device 800 also comprises means for calculating relation measure scores, 820, means for identifying a group of events as related, 822, and means for creating incident information, 824. For a first attribute the means for calculating relation measure scores, 820, calculate relation measure scores between a first instance of the first attribute of the first event and instances of the first attribute of events recently received in the measurement window. The relation measure score depends on a number of co-occurrences in which the first instance of the first attribute and a second instance of the first attribute were received within the measurement window, the total number of occurrences of the first instance and the total number of occurrences of the second instance. The means for identifying a group of events as related, 822, performs grouping of the related events based on their relation measure scores whereas the means for creating incident information, 824, creates incident information based on the identified group of events.

Preferably the means for calculating relation measure scores, 820, are operative to calculate relation measure scores for further attributes of the first event and the means for identifying a group of events as related are operative to identify further groups of related events based on their relation measure scores. This makes the analysis of the events multidimensional. Once the events are analysed in more than one dimension (i.e. more than one attribute are analysed) the means for identifying a group of events as related, 822, are operative to create the incident information based on events that belong to an intersection of the groups of related events. This is schematically illustrated in FIGS. 2A and 2B.

Preferably, the means for calculating relation measure scores, 820, are operative to calculate average values of relation measure scores of all attribute instance relations between the first event and each one of the events recently received in the measurement window. In a preferred embodiment equation 6 may be used for this calculation. The means for identifying a group of events as related, 822, are operative to identify a group of events as related based on events having the calculated average value at or above a first threshold.

In another preferred embodiment, the means for calculating relation measure scores, 820, are operative to calculate an average value of relation measure scores of all instances of attributes between the first event and all events in one of existing groups of events recently received in the measurement window and to repeat the operation of calculating an average value of relation measure scores for the first event and events in other existing groups of events. The calculations in this embodiment are preferably carried out according to equation 7. The means for identifying a group of events as related, 822, are operative to manage the grouping of events based on the calculated average values.

In one embodiment, in managing the grouping of events the means for identifying a group of events as related, 822, are operative to update an existing group of events by adding the first event to the existing group of events if the average value of relation measure scores of all instances of attributes between the first event and all events in the existing group is at or above a second threshold. If there is more than one existing group for which the average relation measure score is at or above the second threshold the means for identifying a group of events as related, 822, are operative to add the first event to the one of the existing groups for which the average relation measure score is the highest.

In an alternative embodiment, in managing the grouping of events the means for identifying a group of events as related, 822, are operative to create a new group of events if the highest average value of relation measure scores of all instances of attributes between the first event and all events in the existing groups is below a second threshold. In yet another preferred embodiment the device 800 is operative to perform reshuffling of events between groups as described in embodiments of the method of the invention. In this embodiment the means for calculating relation measure scores, 820, are operative to calculate a first average value of relation measure scores for every combination of two events belonging to the first group of events and to calculate a second average value of relation measure scores for every combination of two events belonging to the first group of events excluding the first event. As explained earlier, the order of calculation of the average values (the first before the second or the other way round) is irrelevant. If the second average value of relation measure scores is higher than the first average value of relation measure scores the means for identifying a group of events as related, 822, are operative to remove the first event from the first group of events, whereas the means for calculating relation measure scores, 820, are operative to calculate average values of relation measure scores for the remaining existing groups, wherein for each one of the remaining existing groups the average value of relation measure score is calculated with the first event and without the first event. Equation 8 provides one possible way of carrying out the calculations in the operation of reshuffling. Finally, the means for identifying a group of events as related, 822, are operative to add the first event to the one of the existing groups for which the addition of the first event produces the highest increase of the average value of relation measure score.

The various means (e.g. means for identifying a group of events, means for calculating relation measure scores, etc.) and other elements (interface, counters, etc.) disclosed in description of the embodiments of the device for real-time processing of network events may be implemented in the device as discrete elements or may be implemented as software functions. The implementation may be in any suitable form including implementation of functionality in hardware, software, firmware or any combination of these. The elements and components of an embodiment of the invention may be physically, functionally and logically implemented in any suitable way. Elements or parts of the described device may comprise logic encoded in media for performing the operations of the method. Logic may comprise software encoded in a disk or other computer-readable medium and/or instructions encoded in an application specific integrated circuit (ASIC), field programmable gate array (FPGA), or other processor or hardware.

The many advantages of the invention disclosed in this document can be summarised as follow.

The disclosed approach groups network events (configuration changes, KPIs, alarms) having strong relations in a single incident representation. In this way the invention reduces the numbers of network events directly presented to network operators.

Incidents and their representations are updated in real time when events continues coming.

Network operators can analyse and resolve network problems represented as network incidents quickly and save both time and cost for network operators to handle every network event and alarm separately. This is because the number of events incidents is significantly reduced.

The approach is self-learning and adaptive. The static or expert rules for the system are not necessary.

The proposed method is a generic approach for all types of network events.

It is a data agnostic approach for network data.

The approach builds a dynamic knowledge base with unsupervised and continued learning. It can learn network dynamics or changes in real- or near real-time.

The invention claimed is:

1. A method of real-time processing of events received from a network, the network comprises a plurality of network elements connected by a plurality of links, whereas an event comprises a plurality of attributes, the method performed by a processor, the method comprising:

maintaining a plurality of counters, including counters indicating numbers of occurrences of instances of specific attributes of received events as well as counters indicating numbers of co-occurrences, within a defined measurement window, of instances of specific attributes of the received events;
maintaining a record of instances of specific attributes of recent events received in a time period equal to the measurement window;
receiving a first event;
increasing respective counters indicating occurrences and co-occurrences of instances of attributes of received events, based on the instances of attributes of the first event;
for a first attribute, calculating relation measure scores between a first instance of the first attribute of the first event and instances of the first attribute of events recently received in the measurement window, wherein one of the relation measure scores indicates a likelihood that the first event is related to the events recently received in the measurement window according to a calculation that depends on a number of co-occurrences in which the first instance of the first attribute and a second instance of the first attribute were received within the measurement window, the total number of occurrences of the first instance, and the total number of occurrences of the second instance;
identifying a group of events as related based on their relation measure scores;
creating incident information based on the information about the identified group of events.

2. The method as defined in claim 1 comprising calculating relation measure scores for further attributes of the first event and identifying further groups of related events based on their relation measure scores.

3. The method as defined in claim 2, wherein identifying a group of events as related is based on events that belong to an intersection of the groups of related events.

4. The method as defined in claim 2, wherein identifying a group of events as related comprises:
calculating average values of relation measure scores of all attribute instance relations between the first event and each one of the events recently received in the measurement window; and
identifying a group of events as related based on events having the calculated average value at or above a first threshold.

5. The method as defined in claim 2, wherein identifying a group of events as related comprises:
calculating an average value of relation measure scores of all instances of attributes between the first event and all events in one of existing groups of events recently received in the measurement window;
repeating the operation of calculating an average value of relation measure scores for the first event and events in other existing groups of events; and
managing the grouping of events based on the calculated average values.

6. The method as defined in claim 5, wherein managing the grouping of events comprises updating an existing group of events by adding the first event to the existing group of events if the average value of relation measure scores of all instances of attributes between the first event and all events in the existing group is at or above a second threshold.

7. The method as defined in claim 6, wherein if there is more than one existing group for which the average relation measure score is at or above the second threshold then the first event is added to the one of the existing groups for which the average relation measure score is the highest.

8. The method as defined in claim 5, wherein managing the grouping of events comprises creating a new group of events if the highest average value of relation measure scores of all instances of attributes between the first event and all events in the existing groups is below a second threshold.

9. The method as defined in claim 1 comprising performing the operations of the method for a duration of a second time period and, after expiry of the second time period, recording information representative of the groups created in the second time period as historical information and restarting the process of grouping of events for events received after the expiry of the second time period.

10. The method as defined in claim 9 comprising combining a first historical group of events with another historical group of events recorded in the historical information if a relation measure score of these two groups is at or above a third threshold, wherein selecting said another historical group of events comprises calculating relation measure scores between the first historical group of events and all historical groups of events recorded in the historical information and selecting the historical group of events for which the calculated relation measure score with the first historical group of events is the highest.

11. A device for real-time processing of events received from a network, the network comprises a plurality of network elements connected by a plurality of links, whereas an event comprises a plurality of attributes, the device comprising a processor, a memory and a communications interface, said memory containing instructions executable by said processor whereby said device is operative to:
maintain a plurality of counters, including counters indicating numbers of occurrences of instances of specific attributes of received events as well as counters indicating numbers of co-occurrences, within a defined measurement window, of instances of specific attributes of the received events;
maintain a record of instances of specific attributes of recent events received in a time period equal to the measurement window;
receive a first event via the communications interface;
increase respective counters indicating occurrences and co-occurrences of instances of attributes of received events, based on the instances of attributes of the first event;
for a first attribute, calculate relation measure scores between a first instance of the first attribute of the first event and instances of the first attribute of events recently received in the measurement window, wherein one of the relation measure scores indicates a likelihood that the first event is related to the events recently received in the measurement window according to a calculation that depends on a number of co-occurrences in which the first instance of the first attribute and a second instance of the first attribute were received within the measurement window, the total number of occurrences of the first instance, and the total number of occurrences of the second instance;
identify a group of events as related based on their relation measure scores;
create incident information based on the information about the identified group of events.

12. The device as defined in claim 11 further operative to calculate relation measure scores for further attributes of the first event and identify further groups of related events based on their relation measure scores.

13. The device as defined in claim 12, wherein the device is operative to create the incident information based on events that belong to an intersection of the groups of related events.

14. The device as defined in claim 12, wherein in identifying a group of events as related the device is operative to:
calculate average values of relation measure scores of all attribute instance relations between the first event and each one of the events recently received in the measurement window; and
identify a group of events as related based on events having the calculated average value at or above a first threshold.

15. The device as defined in claim 12, wherein in identifying a group of events as related the device is operative to:
calculate an average value of relation measure scores of all instances of attributes between the first event and all events in one of existing groups of events recently received in the measurement window;
repeat the operation of calculating an average value of relation measure scores for the first event and events in other existing groups of events; and
manage the grouping of events based on the calculated average values.

16. The device as defined in claim 15, wherein in managing the grouping of events the device is operative to update an existing group of events by adding the first event to the existing group of events if the average value of relation measure scores of all instances of attributes between the first event and all events in the existing group is at or above a second threshold.

17. The device as defined in claim 16, wherein if there is more than one existing group for which the average relation measure score is at or above the second threshold then the device is operative to add the first event to the one of the existing groups for which the average relation measure score is the highest.

18. The device as defined in claim 15, wherein in managing the grouping of events the device is operative to create a new group of events if the highest average value of relation measure scores of all instances of attributes between the first event and all events in the existing groups is below a second threshold.

19. The device as defined in claim 11 wherein if the first event belongs to a first group of events the device is operative to:
calculate a first average value of relation measure scores for every combination of two events belonging to the first group of events;
calculate a second average value of relation measure scores for every combination of two events belonging to the first group of events excluding the first event;
if the second average value of relation measure scores is higher than the first average value of relation measure scores the device is further operative to:
remove the first event from the first group of events;
calculate average values of relation measure scores for the remaining existing groups, wherein for each one of the remaining existing groups the average value of relation measure score is calculated with the first event and without the first event; and
add the first event to the one of the existing groups for which the addition of the first event produces the highest increase of the average value of relation measure score.

20. The device as defined in claim 11 operative to perform the operations related to grouping the events for a duration of a second time period and, after expiry of the second time period, the device is operative to record information representative of the groups created in the second time period as historical information and to restart the process of grouping of events for events received after the expiry of the second time period.

* * * * *